(12) United States Patent
Fürst

(10) Patent No.: US 7,300,704 B2
(45) Date of Patent: Nov. 27, 2007

(54) FILM COMBINATION WITH AT LEAST TWO LAYERS

(75) Inventor: Michael Fürst, Forchheim (DE)

(73) Assignee: Huhtamaki Forchheim Zweigniederlassung der Huhtamaki Deutschland GmbH & Co. KG, Forchheim (DE)

( * ) Notice: Subject to any disclaimer, the term of this patent is extended or adjusted under 35 U.S.C. 154(b) by 0 days.

(21) Appl. No.: 10/680,013

(22) Filed: Oct. 7, 2003

(65) Prior Publication Data

US 2004/0109968 A1   Jun. 10, 2004

(30) Foreign Application Priority Data

Oct. 8, 2002  (DE) ............................... 102 46 862

(51) Int. Cl.
 B32B 27/32  (2006.01)
 B32B 9/04   (2006.01)
 B32B 7/12   (2006.01)
 B32B 15/08  (2006.01)

(52) U.S. Cl. ............... 428/516; 428/520; 428/447; 428/448; 428/352; 428/355 RA; 428/355 CN

(58) Field of Classification Search ............ 428/474.4, 428/480, 355 RA, 355 CN, 352, 391, 447, 428/474, 448, 516, 520
See application file for complete search history.

(56) References Cited

U.S. PATENT DOCUMENTS

| | | | |
|---|---|---|---|
| 3,686,060 A | | 8/1972 | Gurtler |
| 3,900,102 A | | 8/1975 | Hurst |
| 4,115,619 A | * | 9/1978 | Kurfman et al. ............. 428/336 |
| 4,396,665 A | * | 8/1983 | Rowe .......................... 428/148 |
| 4,442,148 A | * | 4/1984 | Stierli ........................ 428/40.3 |
| 4,757,652 A | | 7/1988 | Kalkanoglu |
| 4,992,315 A | | 2/1991 | Zickell et al. |
| 5,449,552 A | * | 9/1995 | Bochow et al. ............. 428/323 |
| 5,687,517 A | * | 11/1997 | Wiercinski et al. ........... 52/177 |
| 5,824,401 A | | 10/1998 | Jenkins et al. |
| 5,998,015 A | * | 12/1999 | Furst .......................... 428/336 |
| 2003/0215594 A1 | * | 11/2003 | Hamdar et al. ............ 428/40.1 |
| 2004/0109985 A1 | * | 6/2004 | Furst .......................... 428/156 |

* cited by examiner

*Primary Examiner*—Thao Tran
(74) *Attorney, Agent, or Firm*—Collard & Roe, P.C.

(57) ABSTRACT

A film combination or multilayer film with at least two layers is provided for particular use as a release film for membranes that contain oil. At least two film layers are made from different materials.

10 Claims, 1 Drawing Sheet

FILM COMBINATION WITH AT LEAST TWO LAYERS

CROSS REFERENCE TO RELATED APPLICATIONS

Applicant claims priority under 35 U.S.C. §119 of German Application No. 102 46 862.1 filed Oct. 8, 2002.

BACKGROUND OF THE INVENTION

1. Field of the Invention

The present invention relates to a film combination or multilayer film with at least two layers, for particular use as a release film for membranes that contain oil.

2. The Prior Art

A large number of different film combinations have been disclosed. The problem with them, however, is either that the combinations do not have any barrier properties against oils, mineral oils in particular, or that they are not very stable, i.e. they are susceptible to tearing, have poor tear propagation properties or are not very thermally and/or mechanically stable.

SUMMARY OF THE INVENTION

It is an object of the present invention to provide a film combination which has properties that can be varied widely, which can have oil barrier properties and/or is mechanically and thermally stable.

In accordance with the invention, these and other objects are achieved by providing a multilayer film wherein at least two of the film layers are made from different materials. Advantageous properties of the individual materials can be exploited by combining different materials. It has proved to be very advantageous in this context if the film layers have different coefficients of thermal expansion. A film combination can be created as a result that either detaches from or presses itself onto a substrate when it is heated.

It is also very advantageous if in accordance with a further embodiment, at least one of the film layers is produced from a polyolefin. It is, however, also very advantageous if at least one of the film layers is produced from polypropylene. In another advantageous embodiment, at least one of the film layers is produced from polyamide. It has also proved to be very advantageous if at least one of the film layers is produced from polyethylene terephthalate (PET). It has proved to be extremely advantageous in this context if the PET layer is oriented. This means that the mechanical properties of the PET layer can be varied widely. It has also proved to be very advantageous if at least one of the film layers is produced from polyacrylonitrile. In another very advantageous embodiment, at least one of the film layers is produced from a mixture or blend of the above-mentioned raw materials. The properties of the film combination can be varied particularly effectively and precisely by combining very different materials.

In accordance with another embodiment, it is extremely advantageous if at least one side of the film combination is treated so that it has low bonding properties. The film combination can be used as a release film as a result.

In another very advantageous embodiment, at least one side of the film combination is treated with silicone. Silicone has very good release properties. It has proved to be very advantageous if the anti-bonding agent is applied to the film combination by coating. The anti-bonding agent can be applied to the required areas particularly effectively as a result. It has, however, proved to be very advantageous as well if the anti-bonding agent is incorporated in the outermost film layer. The operation required to coat the film combination with anti-bonding agent is not necessary in this case.

In another very advantageous embodiment, at least one of the film layers of the film combination is configured to provide a barrier against mineral oils in particular. In another very advantageous further development, a barrier layer particularly against oils, oxygen and/or UV radiation is provided between two adjacent layers. It is also very advantageous if a layer of lacquer is provided as the barrier particularly against oils, oxygen and/or UV radiation.

The inclusion of a barrier layer prevents the diffusion of oils and/or oxygen through the film structure. A UV radiation barrier avoids harmful effects too. The barrier, for example, makes sure that a substance containing oil with which the film combination is covered does not dry out, so that the adhesive properties of the oily compound are maintained longer. Yellowing of the film combination is avoided as well. The barrier layer also stops the other film layers from swelling, which avoids a wavy and puckered adhesive surface. The above-mentioned barriers can be used either in combination or separately, according to the application.

It has also proved to be very advantageous if in accordance with the invention the individual film layers are combined on the basis of their thermal stability. The thermal stability of the entire film combination can be influenced in this way.

In another advantageous embodiment, the individual film layers are combined according to their mechanical strength. If this is done, the mechanical strength of the film combination can be determined in advance.

It is also very advantageous if the individual film layers are combined according to their susceptibility to initial tearing and/or their tear propagation properties. Allowance can be made in this way for special requirements made by the application for which the film combination is used. The initial tearing and tear propagation properties of the film combination can, for example, be varied by controlled delamination in the case of asymmetrical film combinations in particular.

In another advantageous embodiment, a tie layer and/or adhesive is provided between two adjacent layers. This improves the bonding of the film combination, while it also enables layers which do not normally bond together to be combined.

In another particularly advantageous embodiment, a film layer located further away from the surface with low bonding properties has a larger coefficient of elongation than a film layer that is located closer. This is an effective way to guarantee preventing detachment of the film combination from the object it is covering. The edges of the film combination are pressed against the object by the forces produced.

It has proved to be very advantageous if the film combination is provided as a release film for bituminous membranes. It is also very advantageous if the film combination is provided as a release film for self-adhesive sealing membranes, particularly roofing membranes or similar products.

The film combination in accordance with the invention is particularly suitable for the kind of bituminous membranes that are often used to seal roofs. Reduction in the adhesive force and drying out of the bituminous compound are prevented. In addition to this, the membranes are easy to process and the release liner produces little waste.

Another very advantageous application is when the film combination is provided as a release film for welded membranes, particularly when they have overlap areas that are treated to be self-adhesive. The information provided about roofing membranes applies to welded membranes too.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings.

DETAILED DESCRIPTION OF PREFERRED EMBODIMENTS

Figure 1:
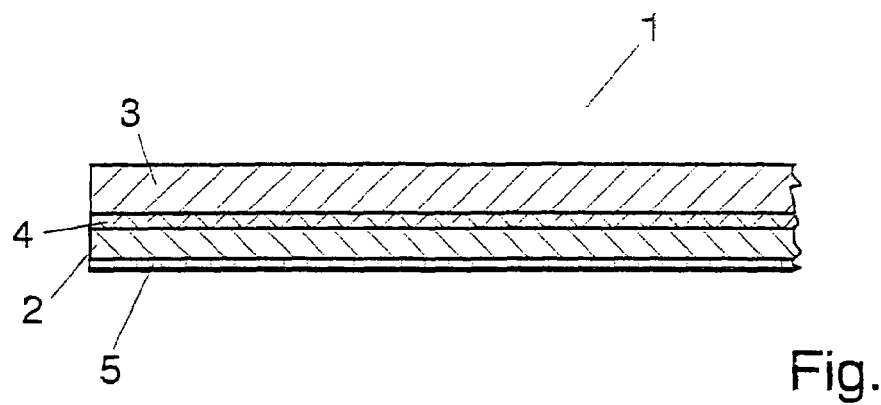
FIG. 1 is a cross section of a three-layer film combination in accordance with the invention.

Turning now in detail to the drawings, FIG. 1 shows a film combination 1 that has a first plastic layer 2 and a second layer 3. The two layers 2 and 3 can be produced from a polyolefin, polypropylene, polyamide, polyethylene terephthalate and/or polyacrylonitrile. It is also possible that at least one of the two layers has been oriented during production. A barrier layer 4, which can consist of a lacquer or a suitable plastic, is located between layers 2 and 3. This barrier layer makes sure that oils, oxygen and/or ultraviolet (UV) radiation do not penetrate. A silicone coating 5 is provided on the surface of layer 2. It is, however, also possible in this context that a different agent can be used to reduce bonding or that an appropriate agent is mixed into layer 2.

Figure 3:
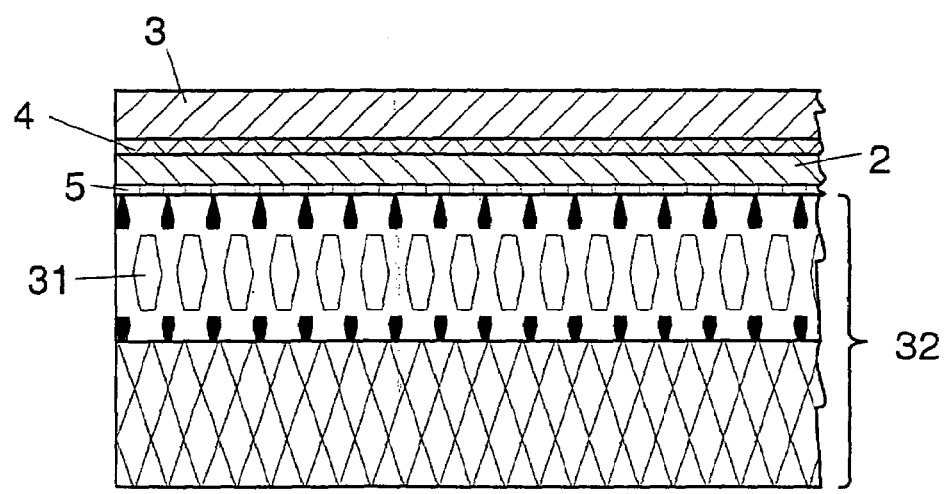
FIG. 3 is a film combination in accordance with the invention that has been applied to a roofing membrane.

Film combination 1 covers a bituminous compound 31 of a roofing membrane 32 or a similar product, as is shown in FIG. 3. Diffusion of oils from the bituminous compound 31 is prevented by the barrier properties of barrier layer 4. Curing attributable to the penetration of oxygen and UV radiation is also prevented. Specially chosen initial tearing and tear propagation properties of film combination 1 facilitate processing of roofing membrane 32. A suitable combination of the individual layers of film combination 1 also makes it possible to vary thermal and mechanical properties of film combination 1 widely in accordance with the requirements in each case. If film combination 1 is configured to be very thin, e.g. because it is not susceptible to initial tearing, little waste is produced when processing roofing membrane 32. The waste that is left over from the film combination 1 is easy to dispose of.

It is also possible that, for example, the film layer 2 itself has barrier properties. This is possible by choosing a suitable plastic. The film combination can have other layers apart from the structure that has already been described. The barrier function of the film combination can also prevent yellowing of the surface of the film combination.

If the individual film layers 2 and 3 are given different coefficients of thermal expansion, a configuration can be achieved in which layer 3 has a higher coefficient of thermal expansion than layer 2. At least the edges of the film combination 1 are pressed against bituminous compound 31 due to this, as a result of which unintentional detachment is prevented.

Figure 2:
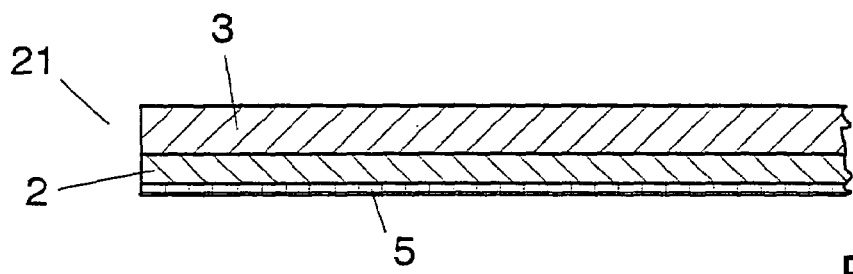
FIG. 2 is a cross section of a two-layer film combination in accordance with the invention.

FIG. 2 shows a further embodiment of a film combination 21. It has two film layers 2 and 3. At least one of the two layers 2 and 3 is produced from a material that has oil barrier properties. This means that an additional barrier layer is unnecessary.

The good barrier properties of the film combination ½1 and the variable mechanical parameters make it possible to create a very thin film combination structure, so that both the handling of the bituminous membranes during production and the processing of the membranes are facilitated considerably. The volume of waste is, for example, reduced considerably by comparison with the paper release liners used in the past. If the film combination is, for instance, configured to be a coextruded polypropylene-polyamide film, the mechanical properties of the film combination with a total thickness of 25µ correspond to those of a purely polypropylene film that is 50µ thick. It is possible that the film combination is produced with a thickness of between 5 and 100µ, depending on the requirements.

While only a few embodiments of the present invention have been shown and described, it is to be understood that many changes and modifications may be made thereunto without departing from the spirit and scope of the invention as defined in the appended claims.

What is claimed is:

1. A multilayer film for roofing membranes having at least two film layers made from different materials;
   wherein the film layers have different coefficients of thermal expansion;
   wherein said at least two film layers comprise a first film layer made from a polyolefin and a second film layer made from a polyolefin or a polyacrylonitrile, said second film layer having a larger coefficient of thermal expansion than said first film layer, whereby the first film layer is adapted to be closer to a substrate to be covered with the multilayer film than the second film layer;
   wherein at least the first film layer of the multilayer film is a barrier against mineral oils;
   wherein at least one surface of the multilayer film is treated so that it has low bonding properties; and
   wherein a second barrier layer against oils, oxygen or UV radiation of lacquer is provided between said first film layer and said second film layer; and
   wherein one side of the first film layer is coated with a silicone layer.

2. The multilayer film according to claim 1, wherein at least one of the film layers is produced from polypropylene.

3. The multilayer film according to claim 1, wherein the second film layer is produced from polyacrylonitrile.

4. The multilayer film according to claim 1, wherein the individual film layers are combined on the basis of their thermal stability.

5. The multilayer film according to claim 1, wherein the individual film layers are combined according to their mechanical strength.

6. The multilayer film according to claim 1, wherein the individual film layers are combined according to their susceptibility to initial tearing or their tear propagation properties.

7. The multilayer film according to claim 1, wherein a tie layer or an adhesive is provided between two adjacent layers.

8. A release film for bituminous membranes comprising a multilayer film for roofing membranes having at least two film layers made from different materials;
- wherein the film layers have different coefficients of thermal expansion;
- wherein said at least two film layers comprise a first film layer made from a polyolefin and a second film layer made from a polyolefin or a polyacrylonitrile. said second film layer having a larger coefficient of thermal expansion than said first film layer, whereby the first film layer is adapted to be closer to a substrate to be covered with the multilayer film than the second film layer;
- wherein at least the first film layer of the multilayer film is a barrier against mineral oils;
- wherein at least one surface of the multilayer film is treated so that it has low bonding properties; and
- wherein a second barrier layer against oils, oxygen or UV radiation of lacquer is provided between said first film layer and said second film layer; and
- wherein one side of the first film layer is coated with a silicone layer.

9. A release film for self-adhesive sealing membranes comprising a multilayer film for roofing membranes having at least two film layers made from different materials;
- wherein the film layers have different coefficients of thermal expansion;
- wherein said at least two film layers comprise a first film layer made from a polyolefin and a second film layer made from a polyolefin or a polyacrylonitrile, said second film layer having a larger coefficient of thermal expansion than said first film layer, whereby the first film layer is adapted to be closer to a substrate to be covered with the multilayer film than the second film layer;
- wherein at least the first film layer of the multilayer film is a barrier against mineral oils;
- wherein at least one surface of the multilayer film is treated so that it has low bonding properties; and
- wherein a second barrier layer against oils, oxygen or UV radiation of lacquer is provided between said first film layer and said second film layer; and
- wherein one side of the first film layer is coated with a silicone layer.

10. A release film for welded areas having overlap areas that are treated to be self-adhesive comprising a multilayer film for roofing membranes having at least two film layers made from different materials;
- wherein the film layers have different coefficients of thermal expansion;
- wherein said at least two film layers comprise a first film layer made from a polyolefin and a second film layer made from a polyolefin or a polyacrylonitrile, said second film layer having a larger coefficient of thermal expansion than said first film layer, whereby the first film layer is adapted to be closer to a substrate to be covered with the multilayer film than the second film layer;
- wherein at least the first film layer of the multilayer film is a barrier against mineral oils;
- wherein at least one surface of the multilayer film is treated so that it has low bonding properties; and
- wherein a second barrier layer against oils, oxygen or UV radiation of lacquer is provided between said first film layer and said second film layer; and
- wherein one side of the first film layer is coated with a silicone layer.

* * * * *